United States Patent
DeCler et al.

(10) Patent No.: US 6,231,089 B1
(45) Date of Patent: May 15, 2001

(54) TWO PIECE MOLDED FEMALE COUPLING

(75) Inventors: Charles Peter DeCler, Stillwater; David W. Meyer, Jordan, both of MN (US)

(73) Assignee: Colder Products Company, St. Paul, MN (US)

( * ) Notice: Subject to any disclaimer, the term of this patent is extended or adjusted under 35 U.S.C. 154(b) by 0 days.

(21) Appl. No.: 09/265,761

(22) Filed: Mar. 10, 1999

(51) Int. Cl.⁷ ................................................. F16L 37/00
(52) U.S. Cl. ........................ 285/308; 285/317; 285/403
(58) Field of Search ............................ 285/317, 23, 308, 285/305, 374, 403, 373, 81, 82

(56) References Cited

U.S. PATENT DOCUMENTS

| | | | |
|---|---|---|---|
| 2,021,241 | 11/1935 | Mall | 285/161 |
| 2,771,308 | 11/1956 | Vitcha et al. | 284/19 |
| 2,819,733 | 1/1958 | Maisch | 138/89 |
| 3,124,157 | 3/1964 | Krezewina | 137/583 |
| 3,124,373 | 3/1964 | Thomsen | 285/18 |
| 3,527,485 | 9/1970 | Goward et al. | 285/305 |
| 3,948,548 | 4/1976 | Voss | 285/321 |
| 4,244,608 | 1/1981 | Stuemky . | |
| 4,423,892 | 1/1984 | Bartholomew | 285/319 |
| 4,436,125 | 3/1984 | Blenkush | 141/330 |
| 4,500,118 | 2/1985 | Blenkush | 285/247 |
| 4,541,457 | 9/1985 | Blenkush | 137/614.06 |
| 4,613,112 | 9/1986 | Phlipot et al. | 251/149.6 |
| 4,630,847 | 12/1986 | Blenkush | 285/29 |
| 4,703,957 | 11/1987 | Blenkush | 285/239 |
| 4,869,534 | 9/1989 | Ketcham et al. | 285/24 |
| 5,040,831 | * 8/1991 | Lewis | 285/305 |
| 5,052,725 | 10/1991 | Meter et al. | 285/308 |
| 5,090,747 | * 2/1992 | Kotake | 285/305 |
| 5,104,158 | 4/1992 | Meyer et al. . | |
| 5,316,041 | * 5/1994 | Ramacier, Jr. et al. | 137/614.04 |
| 5,356,183 | * 10/1994 | Cole | 285/305 |
| 5,366,259 | * 11/1994 | Hohmann et al. | 285/305 |
| 5,374,088 | * 12/1994 | Moretti et al. | 285/305 |
| 5,586,792 | * 12/1996 | Kalahasthy et al. | 285/319 |
| 5,683,117 | * 11/1997 | Corbett et al. | 285/24 |
| 5,695,223 | * 12/1997 | Boticki | 285/23 |
| 5,730,481 | * 3/1998 | Szabo et al. | 285/305 |
| 5,782,502 | * 7/1998 | Lewis | 285/87 |
| 5,799,986 | * 9/1998 | Corbett et al. | 285/55 |
| 5,941,577 | * 8/1999 | Musellec | 285/317 |

FOREIGN PATENT DOCUMENTS

| | | | |
|---|---|---|---|
| 265 929 | 4/1950 | (CH) | 285/305 |
| 265929 | 4/1950 | (CH) . | |
| 1 085 731 | 7/1960 | (DE) | 285/308 |
| 9010814 | 9/1990 | (EP) . | |
| 9800663 | 1/1998 | (EP) . | |
| 387441 | 7/1932 | (GB) | 284/17 |
| WO 90/10814 | 9/1990 | (WO) . | |
| WO 98/00663 | 1/1998 | (WO) . | |

OTHER PUBLICATIONS

Nitto Kohki Col, Ltd, "Nitto Kohki's Footprints Represent the History of Couplers", p. 38 and front page of catalog, date unknown.

* cited by examiner

*Primary Examiner*—Teri Pham Luu
(74) *Attorney, Agent, or Firm*—Merchant & Gould P.C.

(57) ABSTRACT

A quick connect/disconnect coupling having a female coupling member, a male coupling member, and a clip member slidably mounted on the female coupling member for retaining the female and male coupling members together in a coupled state. The clip member is designed to prevent inadvertent actuation thereof, thereby preventing accidental disconnection of the female and male coupling members once they are in the coupled state. The clip member must be actuated from a lock position to an unlock position before the clip member can be actuated from its connect position to its disconnect position. Thus two separate movements of the clip member are required before the coupling can be disconnected and/or connected.

12 Claims, 3 Drawing Sheets

TWO PIECE MOLDED FEMALE COUPLING

FIELD OF THE INVENTION

The invention relates to a coupling assembly for interconnecting fluid passageways and, more particularly, to molded female and male coupling members used in such a coupling.

BACKGROUND OF THE INVENTION

Quick connect/disconnect coupling assemblies for small flexible tube applications and other applications are known in the art. Such couplings are often times utilized for biomedical applications, convenience handling, beverage dispensing, instrument connections, photochemical handling, as well as for many other applications.

U.S. Pat. Nos. 4,436,125, 5,052,725 and 5,104,158 each disclose a quick connect/disconnect coupling assembly including cooperating female and male couplings, each defining a fluid passageway therethrough. The male coupling is constructed for releasable attachment to the female coupling. The male coupling includes a seal for providing a fluid tight seal between the male and female couplings. The female coupling includes a releasable locking or quick connecting/disconnecting mechanism for locking the male and female couplings together in a coupled state. The locking mechanism includes a locking collar or plate which is slideably mounted in grooves formed in the female coupling. The plate slides between a first or released position and a second or locked position. In the locked state, an inner edge of the plate extends into the bore of the female coupling and engages a groove or indentation in the surface of the male coupling so as to lock the male and female coupling together.

Additionally, Nitto Kohki Co. Ltd. of Tokyo, Japan, illustrates on page 38 of its *Quick Connective Fluid Coupler* catalog a coupling having male and female couplings that are locked together by a slidable locking plate.

It has been found that prior art couplings that utilize a slidable locking plate can become inadvertently disconnected, which could potentially cause a fluid leakage or spill. In particular, the locking plate can be accidentally actuated to the first, released position, such as when the coupling and the fluid lines connected thereto are dropped and the locking plate hits the floor or when any inadvertent force is applied to the locking plate. When there is fluid flowing through the fluid lines connected to the coupling, and such an accidental actuation of the locking plate occurs, the male and female couplings can become partially or fully disconnected, thereby allowing fluid to escape. Such a fluid leakage is especially dangerous when the fluid in the fluid lines is hazardous to the environment or to humans.

What is needed then is an improved quick connect/disconnect coupling assembly having cooperating female and male couplings that is designed to prevent accidental disconnection of the male and female couplings, while retaining many of the advantages of the prior art coupling assemblies.

SUMMARY OF THE INVENTION

The invention provides an improved quick connect/disconnect coupling having a female coupling member, a male coupling member, and a clip member slidably mounted on the female coupling member for retaining the female and male coupling members together in a coupled state. The clip member is designed to prevent inadvertent actuation thereof, thereby preventing accidental disconnection of the female and male coupling members once they are in the coupled state.

In one embodiment in accordance with the invention, a quick connect/disconnect coupling is provided that includes a female coupling member having a front end and a back end, and defining a path for the flow of fluid therethrough. The coupling further includes a male coupling member having a front end and a back end and defining a path for the flow of fluid therethrough, with the front end of the male coupling member being insertable into the front end of the female coupling member. A quick connect/disconnect clip member is slidably mounted on the female coupling member whereby the clip member is slidable between a connect position wherein the clip member engages the male coupling member for retaining the male coupling member within the female coupling member and a disconnect position wherein the clip member is disengaged from the male coupling member thereby enabling disconnection of the male coupling member and the female coupling member. The clip member is further movable between a lock position at which sliding movement of the clip member from the connect position to the disconnect position is prevented and an unlock position at which sliding movement of the clip member from the connect position to the disconnect position is permitted.

Thus, the clip member must first be moved to the unlock position before the clip member can be actuated to the disconnect position. The additional movement of the clip member to the unlock position prevents accidental actuation of the clip member to the disconnect position, thereby preventing accidental disconnection of the female and male coupling members.

In another embodiment in accordance with the invention, a quick connect/disconnect coupling is provided that includes a female coupling member having a front end and a back end, and defining a path for the flow of fluid therethrough. The coupling further includes a male coupling member having a front end and a back end and defining a path for the flow of fluid therethrough, with the front end of the male coupling member being insertable into the front end of the female coupling member. A quick connect/disconnect clip member is slidably mounted on the female coupling member whereby the clip member is slidable between a connect position wherein the clip member engages the male coupling member for retaining the male coupling member within the female coupling member and a disconnect position wherein the clip member is disengaged from the male coupling member thereby enabling disconnection of the male coupling member and the female coupling member. The clip member includes a shoulder that is selectively engageable with and disengageable from the female coupling member, wherein sliding movement of the clip member from the connect position to the disconnect position is prevented when the shoulder is engaged with the female coupling member.

In yet another embodiment in accordance with the invention, a female coupling member is provided including a housing having a front end and a back end and defining a path for the flow of fluid therethrough. A slot is defined in the housing and extends generally transversely of the flow path. A quick connect/disconnect clip member is slidably mounted in the slot whereby the clip member is slidable in a direction generally transverse to the flow path between a first position and a second position. In addition, the clip member is movable within the slot between a lock position at which the clip member is retained at the first position and sliding movement of the clip member from the first position to the second position is prevented and an unlock position at which sliding movement of the clip member from the first position to the second position is permitted.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

Referring now to the drawings wherein like reference numerals indicate corresponding parts throughout the several views.

DETAILED DESCRIPTION OF THE INVENTION

Figure 1:
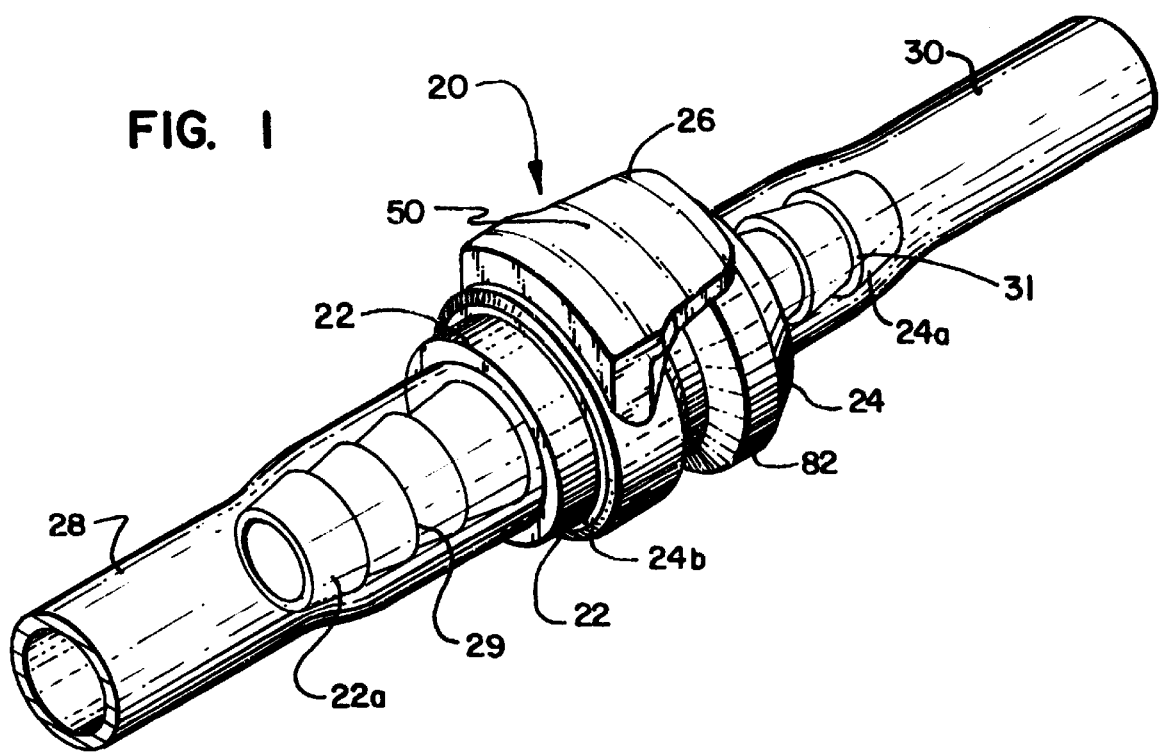
FIG. 1 is a perspective view of a preferred embodiment of a quick connect/disconnect coupling in accordance with the invention being illustrated connecting two pieces of tubing.

The invention relates to a quick connect/disconnect coupling having a male coupling member, a female coupling member and a quick connect/disconnect clip member slidably mounted on the female coupling member, as well as to a female coupling member having a quick connect/disconnect clip member slidably mounted in a slot defined therein, wherein the clip member is designed to prevent accidental actuation thereof to a position that would permit disconnection of the male and female coupling members.

One specific implementation of the invention is illustrated in FIGS. 1–6, with the quick connect/disconnect coupling being generally referenced by the reference numeral 20. The coupling 20 includes a male coupling member 22 and a female coupling member 24, the male coupling member 22 including a back end portion 22a and a front end portion 22b and the female coupling member 24 including a back end portion 24a and a front end portion 24b. A locking collar, herein referred to as a quick connect/disconnect clip member 26, is used to quickly disconnect and connect the male and female coupling members 22, 24.

In the illustration of FIG. 1, the coupling 20 is shown as being interconnected to two pieces of tubing 28, 30. The tubing 28, 30 is attached to barbed ends 29, 31 of the male and female coupling members 22, 24, respectively. It will be appreciated, however, that the coupling 20 of the invention has numerous uses other than connecting two pieces of tubing together.

In the specific implementation shown, the male coupling member 22 and the female coupling member 24 define paths 32, 34, respectively, for the flow of fluid therethrough. An O-ring seal 36 is disposed in a circumferential groove about the exterior surface of the male coupling member 22 for providing a fluid tight seal between the exterior surface of the male coupling member 22 and the interior surface of the female coupling member 24 when in the connected state, as can be seen from FIG. 4. Although the specific implementation of the invention is described herein as being used with respect to fluid flow paths, it will be appreciated that the invention might have other uses, such as interconnecting electrical wires or the like.

Referring now more particularly to FIGS. 2–6, the male coupling member 22, the female coupling member 24 and the clip member 26 are each preferably made as a one-piece molded plastic component in this specific implementation. The clip member 26 includes a tab portion 50 and a plate portion 52 interconnected to each other at roughly a right angle in a generally L-shaped configuration. The tab portion 50 provides a surface for the user to press down on the clip member 26 so as to actuate the clip member 26 from the connect position, shown in FIG. 4, to the disconnect position, shown in FIG. 3, when inserting the male coupling member 22. In some implementations of the invention, it is not necessary to manually force the clip member downward when inserting the male coupling member 22 as the male coupling member, upon engagement with a curvilinear inner edge 54 of the plate portion 52, will force the clip member downward to the disconnect position.

The plate portion 52 defines an aperture 56 sufficiently large to allow the front end portion 22b of the male coupling member 22 to extend therethrough and is generally alignable with the fluid pathway 34 of the female coupling member 24. The plate portion 52 slides in a slot 58 extending transversely of the female coupling member 24.

Figure 5:
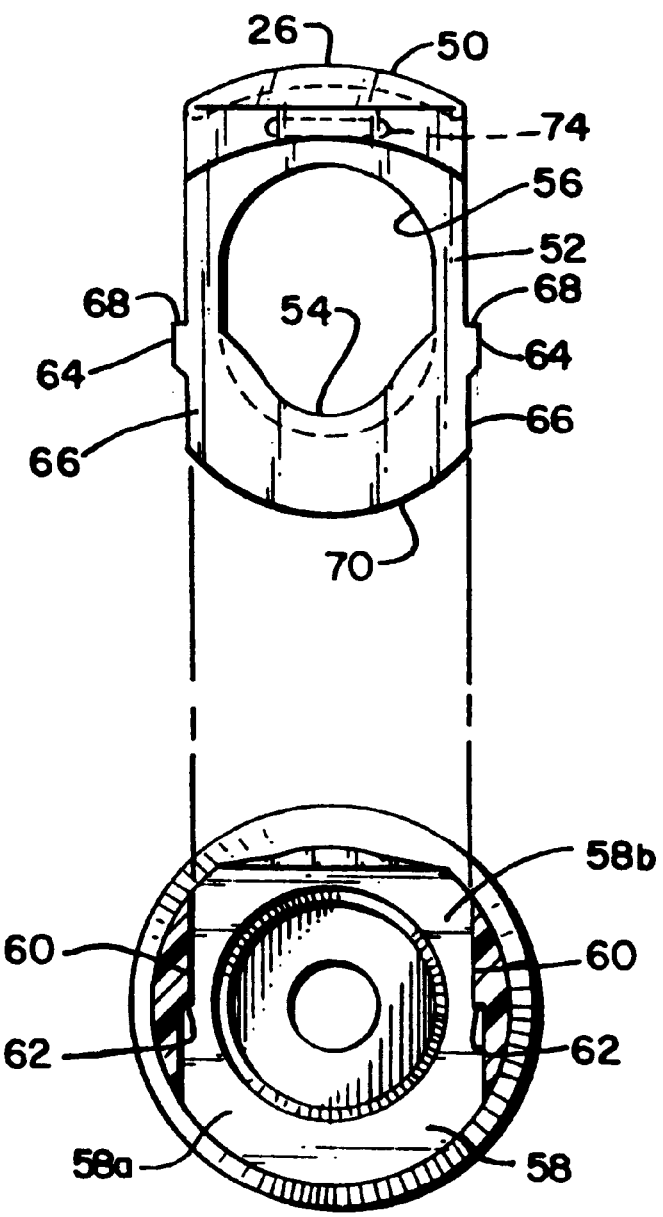
FIG. 5 is a transverse sectional view taken generally along line 5—5 of FIG. 2 of the female coupling member illustrating the clip member removed therefrom and aligned for insertion the slot of the female coupling member.

As seen from the transverse sectional view of FIG. 5, the slot 58 is wider proximate its bottom portion 58a than its top portion 58b. The side surfaces 60 of the female coupling member 24 which define the slot 50 include shoulder portions 62 at the intersection of the wide portion of the slot 58 with the narrow portion of the slot 58. The plate portion 52 of the clip member 26 in turn includes projections 64 along its side edges 66. The projections 64 each include a substantially flat portion 68 for engaging the respective shoulder portion 62 of the female coupling member 24 so as to prevent the clip member 26 from being inadvertently removed from the female coupling member 24 after it has been inserted. This assures that the clip member 26 will remain with the female coupling member 24 at all times in typical use.

Figure 4:
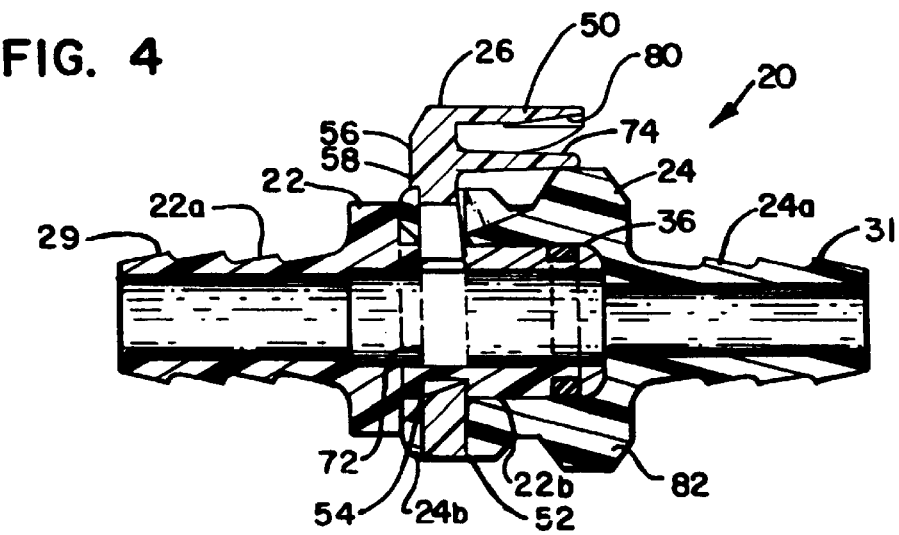
FIG. 4 is a view similar to FIG. 3 illustrating the male and female coupling members being coupled, with the clip member returned back to the lock position and the connect position.

The bottom of the plate portion 52 has a curvilinear surface 70 which generally matches that of the curvilinear surface of the female coupling member 24. Furthermore, the curvilinear inner edge portion 54 of the plate portion 52 has a thickness that enables the inner edge portion 54 to rest in a circumferential groove 72 formed on the male coupling member 22 when in the connect position, as is illustrated in FIG. 4.

Figure 3:
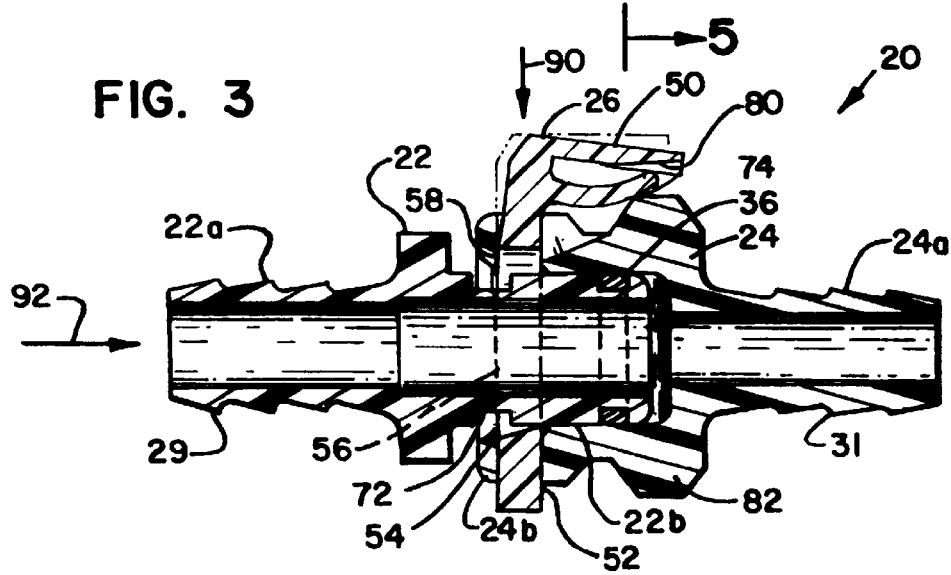
FIG. 3 is a cross sectional view of the embodiment shown in FIG. 1, with the male coupling member being partially inserted into the female coupling member, with the clip member being illustrated in the unlock position and in the disconnect position.

A resilient biasing member 74 is disposed below the tab portion 50. Upon pressing down on the clip member 26, as generally illustrated in FIG. 3, the resilient biasing member 74 is displaced from its at rest position to a displaced position. The clip member 26 is thereby biased upwardly toward the connect position, such that when the groove 72 of the male coupling member 22 is aligned with the curvilinear inner edge 54 of the clip member 26, the resilient biasing member 74 will force the clip member 26 upward into engagement with the groove 72 thereby placing the clip member into the connect position and retaining the male and female coupling members 22, 24 in a coupled state upon the application of fluid pressure.

Figure 2:
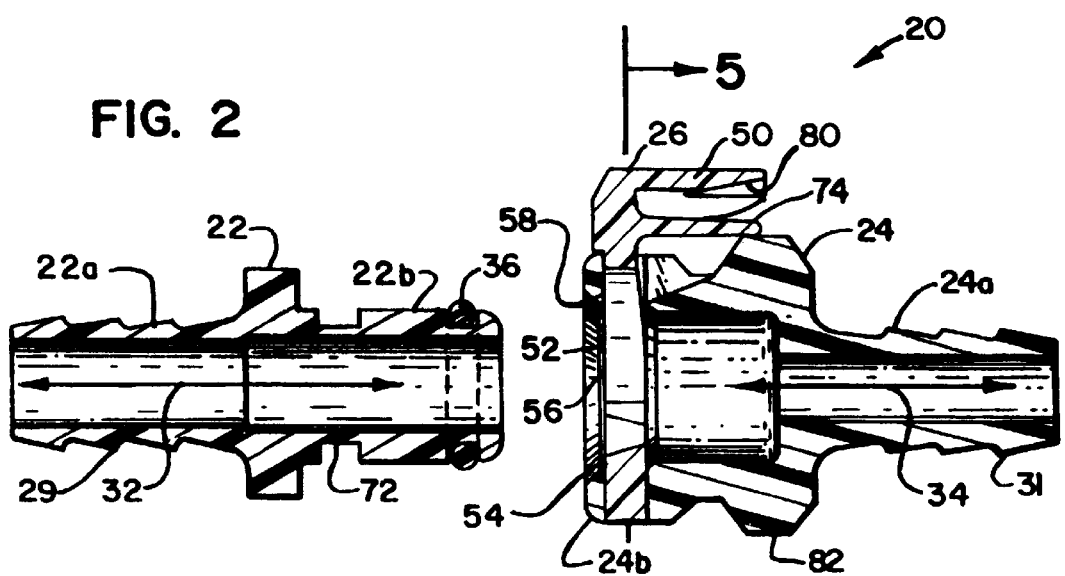
FIG. 2 is a cross sectional view of the embodiment shown in FIG. 1, with the male and female coupling members being uncoupled and separated from one another, the male coupling member being in axial alignment with the female coupling member.

As illustrated in FIG. 2, an under surface 80 of the tab portion 50 is slanted so as to provide additional clearance between the resilient biasing member 74 and the under surface 80 of the tab portion 50. In addition, the female coupling member 24 includes a raised surface 82 which the distal end of the resilient biasing member 74 engages so as to provide clearance between the remainder of the resilient biasing member 74 and the female coupling member 24 such that the clip member 26 can be depressed downwardly.

Figure 6:
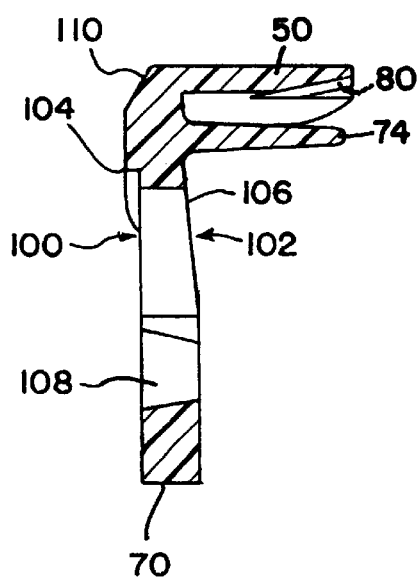
FIG. 6 is a cross sectional view of the clip member, taken along line 6—6 of FIG. 5.

With reference now to FIG. 6, it is seen that the plate portion 52 of the clip member 26 includes a front face 100 and a back face 102, with the resilient biasing member 74 being connected to the back face 102 adjacent the top thereof. A shoulder 104 is disposed on the front face 100, generally opposite from the resilient biasing member 74. As seen from FIG. 5, the shoulder 104 is generally arcuate in shape so as to match the curvilinear surface of the female coupling member 24 and extends between the two side edges 66. The shoulder 104 thus engages the exterior surface of the female coupling member 24 when the clip member 26 is at the connect position, shown in FIGS. 2 and 4, to thereby prevent the clip member 26 from being pressed downward from the connect position to the disconnect position. The clip member 26 is thus positioned at a lock position, shown in FIGS. 2 and 4, which prevents accidental actuation of the clip member 26. The clip member 26 must first be actuated to an unlock position, shown in FIG. 3, to disengage the shoulder 104 from the outer surface of the female coupling member 24 and thereby allow the clip member 26 to be actuated downward from the connect position to the disconnect position.

To provide for movement of the clip member 26 to the unlock position, the plate portion 52 of the clip member 26 includes a first, tapering section 106 that increases in thickness generally from the resilient biasing member 74 and the shoulder 104 to generally about the flat portions 68 of the projections 64. The back face 102 of the first section 106 slants away from the front face 100 thereof such that the thickness of the first section 106 increases steadily. The plate portion 52 further includes a second, constant thickness section 108 that extends from the first section to the bottom curvilinear edge 70 of the plate portion 52, with the back face 102 being generally parallel to the front face 100. It is seen from FIG. 6 that the front face of the first section 106 is generally coplanar with the front face of the second section 108 such that the increasing thickness of the first section 106 is due solely to the slanting of the back face of the first section.

As can be seen from FIGS. 2–4, the slot 58 has a generally constant thickness, such that a space is formed between the first section 106 and the slot 58. Furthermore, the thickness of the second section 108 is generally equal to the thickness of the slot 58 adjacent thereto (i.e. the lower portion of the slot 58 in which the second section 108 is disposed). Due to the tapering thickness of the first section 106, the clip member 26 is slightly flexible such that by applying a force directed to the right proximate the junction of the tab portion 50 and plate portion 52 of the clip member 26, the clip member 26 can be bent to the unlock position, as shown in FIG. 3, thereby disengaging the shoulder 104 from the female coupling member 24 and enabling the clip member 26 to be pressed downward to the disconnect position. As used herein, the term thickness refers to the dimension of the first section 106, the second section 108 and the slot 58 along the direction of the flow paths 32, 34 (i.e. left-right in FIGS. 2–4).

By forming the second section 108 such that its thickness is generally equal to the thickness of the slot 58, rotation of the clip member 26 within the slot 58 upon application of the bending force at the opposite end of the clip member 26 is prevented. Instead, the tapering thickness of the first portion 106 enables the clip member 26 to flex and bend to the disconnect position within the relatively larger slot. It is to be realized that the combined thickness of the shoulder 104 and the first section 106 adjacent thereto must be slightly less than the thickness of the slot 58 in order to permit the clip member 26 to be pressed downward into the slot 58 to the disconnect position. As best seen in FIGS. 5 and 6, the junction of the tab 50 and plate portion 52 is provided with a flat section 110 on the front face 100 to facilitate the application of the bending force to the clip member 26.

Although the first section 106 of the clip member 26 has been described as increasing in thickness from the biasing member 74 to about the flat portions 68 of the projections 64, other designs for rendering the clip member 26 flexible or bendable are within the scope of the invention. For instance, the first section 106 could have a constant thickness from the biasing member to the flat portions of the projections, with the thickness being less that the thickness of the slot 58. The second section 108 could have an increasing thickness from the first section to the bottom edge 70, with the thickness at the bottom edge being generally equal to the thickness of the slot 58 adjacent thereto. Thus, the clip member could bend about the juncture of the first and second sections. Of course numerous other designs are possible for providing a flexible or bendable clip member, with the design being chosen based, in part, on the desired amount of flexing or bending of the clip member.

The quick connect/disconnect coupling in the specific implementation of the invention described herein is preferably molded as three separate pieces, the male coupling member 22, the female coupling member 24 and the clip member 26. The coupling can be made of numerous types of material, such as plastic or metal. An acetal plastic, such as Delrin® is one type of plastic that might be used for the clip member 26, while polypropylene might be used for the male and female coupling members because of its chemical properties. The clip member 26 is then inserted into the slot 58 of the female coupling member 26 in the manner previously described. Throughout its use, the clip member 26 will be retained with the female coupling member 24 by the projections 64 interacting with the shoulder portions 62 of the female coupling member 24.

In use, the clip member 26 will normally be in its connect position and lock position when the resilient biasing member 74 is in its rest position. To insert the male coupling member 22, the clip member 26 must first be bent backward to the unlock position (FIG. 3), at which point the shoulder 104 is no longer disposed over the surface of the female coupling member 24 but is instead located completely within the slot 58. Once the shoulder 104 is disengaged from the female coupling member 24, the clip member 26 is pressed downward, as illustrated by an arrow 90 in FIG. 3, and the male coupling member 22 is then inserted into the female coupling member, as generally illustrated by the arrow 92 in FIG. 3. The clip member 26 is then released. Upon alignment of the circumferential groove 72 with the inner edge portion 56, the clip member 26 will be biased upward to its connect position by the resilient biasing member 74 as generally illustrated in FIG. 4 wherein the coupling is illustrated in a coupled state.

As mentioned previously, in some embodiments, by merely inserting the male coupling member 22, the clip member 26 will be forced downward to its disconnect position, but only after the clip member 26 is bent to its unlock position. Thus, these embodiments would do away with the need for the user to press down on the tab portion 50 of the clip member. Furthermore, in some embodiments, once the male coupling member 22 is inserted far enough to align the groove 72 with the edge portion 54 of the clip member, the coupling 20 will generate an audible signal as the clip member 26 snaps into its connect position.

To uncouple the coupling 20, the user must first bend the clip member back to the unlock position, and then press down on the clip member 26 to enable removal of the male coupling member 22.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A quick connect/disconnect coupling, comprising:
   a female coupling member having a front end and a back end, the female coupling member defining a path for the flow of fluid therethrough;
   a male coupling member having a front end and a back end and defining a path for the flow of fluid therethrough, the front end of the male coupling member being insertable into the front end of the female coupling member; and
   a quick connect/disconnect clip member slidably mounted on the female coupling member whereby the clip member is slidable between a connect position wherein the clip member engages the male coupling member for retaining the male coupling member within the female coupling member and a disconnect position wherein the clip member is disengaged from the male coupling member thereby enabling disconnection of the male coupling member and the female coupling member, said clip being movable between a lock position and an unlock position wherein the clip member includes a means for preventing sliding movement of the clip member from the connect position to the disconnect position when the clip is in the lock position and permitting sliding movement of the clip member from the connect position to the disconnect position when the clip is in the unlock position.

2. The quick connect/disconnect coupling according to claim 1, wherein said clip member includes a plate portion having a front face and a back face, and wherein a shoulder is disposed on said front face and is engaged with said female coupling member at the lock position and is disengaged from said female coupling member at the unlock position, and a resilient biasing member is disposed on said back face and biases said clip member toward the connect position.

3. The quick connect/disconnect coupling according to claim 2, wherein said plate portion is disposed in a slot formed in said female coupling member, and said plate portion includes a first section adjacent said shoulder having an increasing thickness and a second section with a substantially constant thickness connected to said first section.

4. The quick connect/disconnect coupling according to claim 3, wherein the thickness of said first section adjacent said shoulder is less than a thickness of said slot adjacent thereto, and the thickness of said second section is substantially equal to the thickness of said slot adjacent thereto.

5. A quick connect/disconnect coupling, comprising:
   a female coupling member having a front end and a back end, the female coupling member defining a path for the flow of fluid therethrough;
   a male coupling member having a front end and a back end and defining a path for the flow of fluid therethrough, the front end of the male coupling member being insertable into the front end of the female coupling member;
   a quick connect/disconnect clip member slidably mounted on the female coupling member whereby the clip member is slidable between a connect position wherein the clip member engages the male coupling member for retaining the male coupling member within the female coupling member and a disconnect position wherein the clip member is disengaged from the male coupling member thereby enabling disconnection of the male coupling member and the female coupling member, and wherein the clip includes a shoulder that is selectively engageable with and disengageable from said female coupling member, and wherein sliding movement of said clip member from the connect position to the disconnect position is prevented when said shoulder is engaged with said female coupling member; and
   a resilient member connected to said clip member, said resilient member biasing said clip member toward the connect position when said clip member is at the disconnect position.

6. The quick connect/disconnect coupling according to claim 5, wherein said clip member includes a plate portion having a front face and a back face, and wherein a shoulder is disposed on said front face and is engaged with said female coupling member at the lock position and is disengaged from said female coupling member at the unlock position, and said resilient biasing member is disposed on said back face.

7. The quick connect/disconnect coupling according to claim 6, wherein said plate portion is disposed in a slot formed in said female coupling member, and said plate portion includes a first section adjacent said shoulder having an increasing thickness and a second section with a substantially constant thickness connected to said first section.

8. The quick connect/disconnect coupling according to claim 7, wherein the thickness of said first section adjacent said shoulder is less than a thickness of said slot adjacent thereto, and the thickness of said second section is substantially equal to the thickness of said slot adjacent thereto.

9. A female coupling member, comprising:
   a housing having a front end and a back end and defining a path for the flow of fluid therethrough, a slot being defined in said housing and extending generally transversely of the flow path; and
   a quick connect/disconnect clip member slidably mounted in said slot whereby said clip member is slidable in a direction generally transverse to the flow path between a first position and a second position, the clip member is movable within the slot between a lock position and an unlock position wherein the clip member includes a means for retaining the clip member at the first position and for preventing sliding movement of the clip member from the first position to the second position when the clip member is in the lock position and for permitting sliding movement of the clip member from the first position to the second position when the clip is in the unlock position.

10. The female coupling member according to claim 9, wherein said clip member includes a plate portion having a front face and a back face, and wherein a shoulder is disposed on said front face and is engaged with said female coupling member at the lock position and is disengaged from said female coupling member at the unlock position, and a resilient biasing member is disposed on said back face and biases said clip member toward the connect position.

11. The quick connect/disconnect coupling according to claim 10, wherein said plate portion is disposed in a slot formed in said female coupling member, and said plate portion includes a first section adjacent said shoulder having an increasing thickness and a second section with a substantially constant thickness connected to said first section.

12. The female coupling member according to claim 11, wherein the thickness of said first section adjacent said shoulder is less than a thickness of said slot adjacent thereto, and the thickness of said second section is substantially equal to the thickness of said slot adjacent thereto.

\* \* \* \* \*

UNITED STATES PATENT AND TRADEMARK OFFICE
CERTIFICATE OF CORRECTION

PATENT NO. : 6,231,089 B1
DATED : May 15, 2001
INVENTOR(S) : DeCler et al.

It is certified that error appears in the above-identified patent and that said Letters Patent is hereby corrected as shown below:

<u>Title page,</u>
Item [56], References Cited, U.S. PATENT DOCUMENTS: insert -- 2,450,430 10/1948 Hight 285/317 -- after "2,021,241 11/1935 Mall 285/161"

<u>Column 3,</u>
Line 42, insert -- into -- after "insertion"

Signed and Sealed this

Twenty-seventh Day of August, 2002

Attest:

Attesting Officer

JAMES E. ROGAN
*Director of the United States Patent and Trademark Office*